United States Patent

[11] 3,596,440

| [72] | Inventors | Raymond W. Nutter<br>Fairview;<br>Frederick M. Sitter, Erie, both of, Pa. |
|---|---|---|
| [21] | Appl. No. | 824,510 |
| [22] | Filed | May 14, 1969 |
| [45] | Patented | Aug. 3, 1971 |
| [73] | Assignee | Van-Air, Incorporated<br>Erie, Pa. |

[54] GAS SCRUBBER
8 Claims, 6 Drawing Figs.

[52] U.S. Cl................................................. 55/320,
55/418, 55/462, 55/475, 55/527
[51] Int. Cl........................................................ B01d 50/00
[50] Field of Search........................................... 55/96, 97,
98, 242, 320, 329, 418, 437, 462, 473, 475, 494,
578, 527, 528, 526, 185, 186, 259; 210/283, 291,
293

[56] References Cited
UNITED STATES PATENTS

| Re.23,009 | 6/1948 | Camp.......................... | 210/293 |
| 917,619 | 4/1909 | Lamb et al................... | 55/475 |
| 932,686 | 8/1909 | Diserens..................... | 55/418 |
| 1,033,809 | 7/1912 | Larson ........................ | 55/494 |
| 2,024,122 | 12/1935 | Wemhoener................. | 55/242 |
| 2,273,779 | 2/1942 | Dickey et al................. | 55/320 |
| 3,066,462 | 12/1962 | Yap et al. .................... | 55/Agg |
| 3,246,453 | 4/1966 | Becker......................... | 55/418 |
| 3,339,351 | 9/1967 | Carmichael, Jr. et al..... | 55/475 |
| 3,352,778 | 11/1967 | Brink, Jr. et al. ............. | 55/185 |

*Primary Examiner* — Frank W. Lutter
*Assistant Examiner* — Bernard Nozick
*Attorney* — Baldwin, Egan, Walling & Fetzer

ABSTRACT: An air or gas filter or scrubber adapted for disposal downstream from an air or gas compressor, for removing hydrocarbons from the compressed air or gas stream. The scrubber comprises an enclosure containing an elastic bed of curled fibrous material of generally open pore nature through which the compressed air or gas passes, with such bed scrubbing the air or gas and soaking up and retaining hydrocarbons, dirt and other contaminants. A drain is provided in the bottom of the enclosure for removing hydrocarbon and other contaminant solution from the mechanism as it drains down from the bed. The bed material may have a bulk density of between approximately 12 to 22 pounds per cubic foot, and results in very little pressure drop through the mechanism.

INVENTORS
RAYMOND W. NUTTER
FREDERICK M. SITTER

Baldwin, Egan, Walling & Fetzer
ATTORNEYS

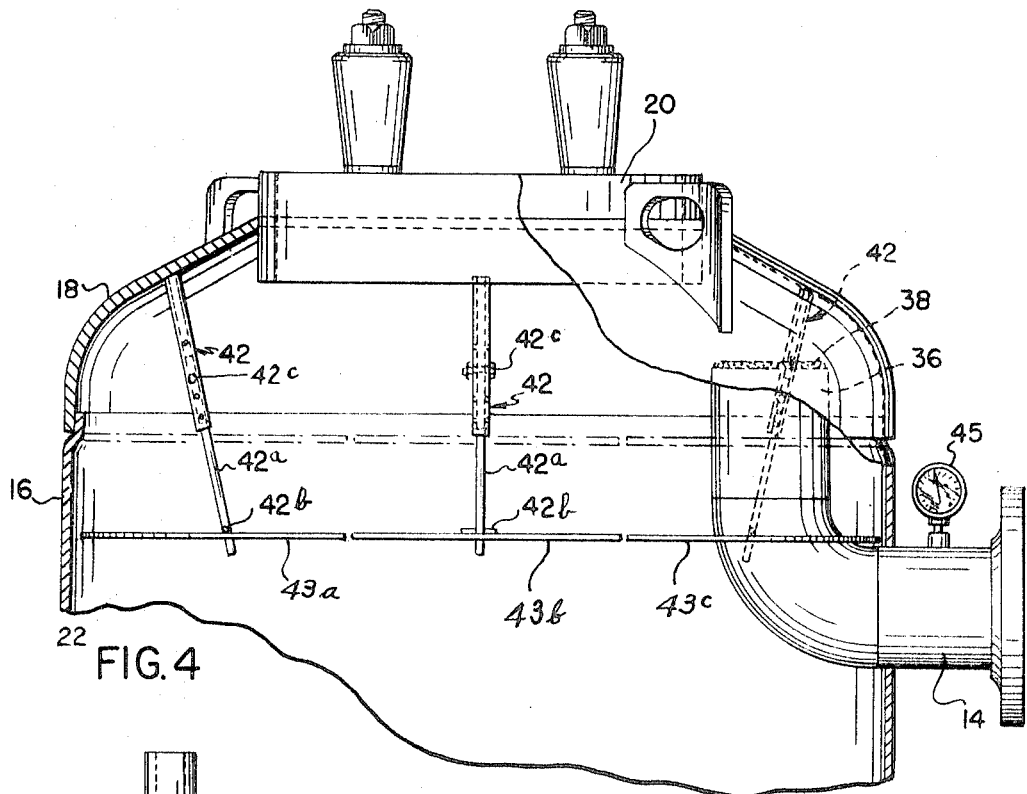
FIG. 4
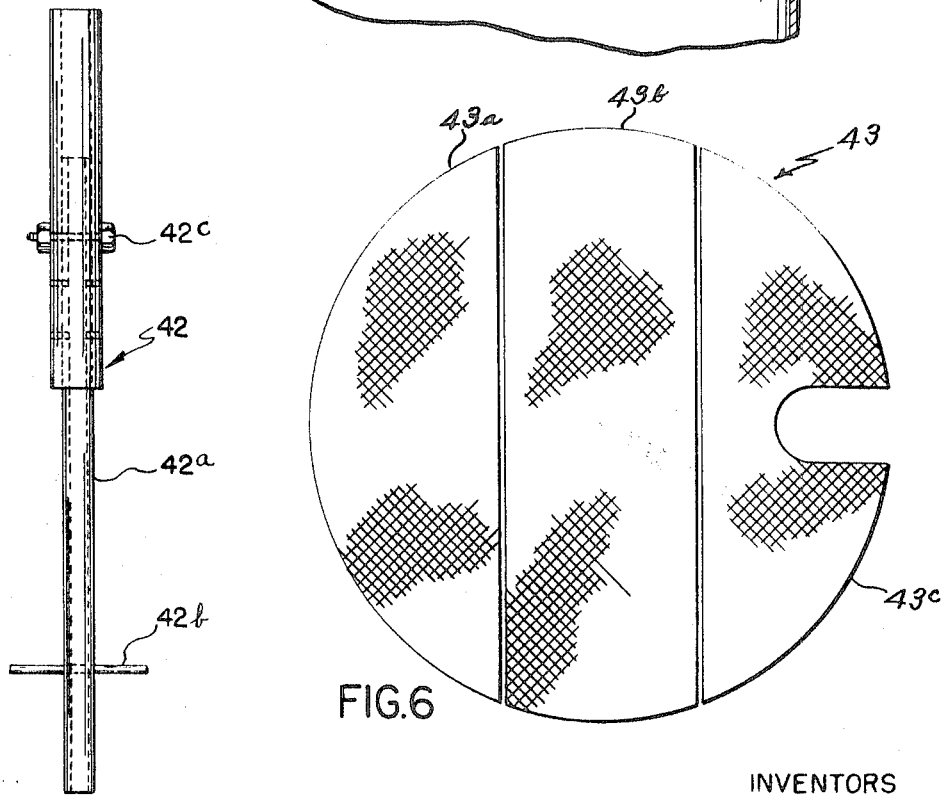
FIG. 5
FIG. 6
INVENTORS
RAYMOND W. NUTTER
FREDERICK M. SITTER
BY
Baldwin, Egan, Walling & Fetzer
ATTORNEYS

GAS SCRUBBER

This invention relates in general to a gas or air filter or scrubber mechanism and more particularly to an air or gas scrubber mechanism which utilizes a fibrous meshlike bed of material for removing hydrocarbons and other contaminants from the air or gas stream. Hereafter the use of the term gas will be understood to include air.

Compressed gas is utilized in a great many industrial applications, and mechanical gas compressors are usually used to compress the gas to the desired pressure. Such compressors are conventionally lubricated with petroleum and hydrocarbon lubricants, and during the compression of the gas, the temperature is raised and some of the lubricating oils vaporize forming a wide range or organic products which find their way into the compressed gas stream. Moreover, initially the gas prior to the compression thereof may be polluted with many contaminants, including hydrocarbons, moisture, dust, pollen and other foreign matter and the like, and thus the compressed gas may be quite "dirty" as it is emitted from the gas compressor.

The present invention provides a gas scrubber which is adapted for disposal downstream from the gas compressor for effectively removing hydrocarbon and other contaminants, including liquids, aerosols, droplets, mists, and solid particles, from the gas stream.

Accordingly, an object of the invention is to provide a novel simplified gas filter or scrubber mechanism for removing hydrocarbons and other contaminants and one which produces minimum pressure drop in the gas stream.

Another object of the invention is to provide a scrubber mechanism of the aforesaid type which utilizes an elastic bed of curled fibrous meshlike material for effecting removal of contaminants from the gas stream.

Another object of the invention is to provide a mechanism of the aforediscussed type wherein the bulk density of the material of the bed is within a range of approximately 12 to 22 pounds per cubic foot.

A still further object of the invention is to provide a mechanism of the aforediscussed type wherein the gas pervious bed is of a substantially open pore nature and is comprised of corrosion resistant materials, such as for instance curled bronze or stainless steel wire or ribbon in meshlike form, and wherein the pressure drop through the scrubber mechanism is 1 percent or less.

Other objects and advantages of the invention will be apparent from the following description taken in conjunction with the accompanying drawings wherein:

FIG. 4 is a fragmentary, partially sectioned view of the upper end portion of the scrubber illustrating the holddown grating assembly; —

FIG. 5 is an enlarged elevational view of one of the adjustable hold down rods for the holddown grating assembly; and FIG. 6 is a reduced size top plan view of the sectional holddown grating.

Figure 1:
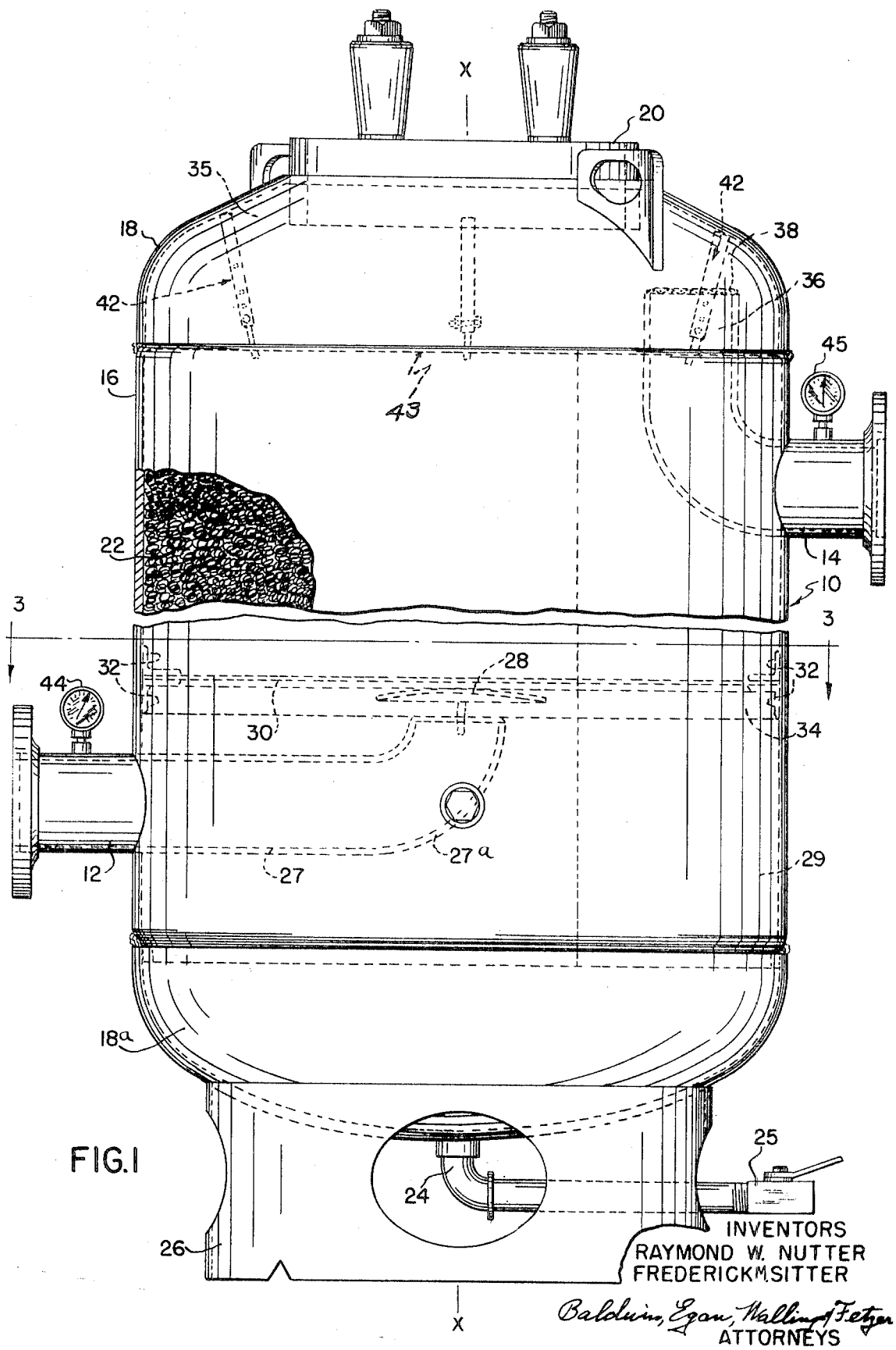
FIG. 1 is a broken, side elevational view of a gas scrubber mechanism constructed in accordance with the invention.
Figure 2:
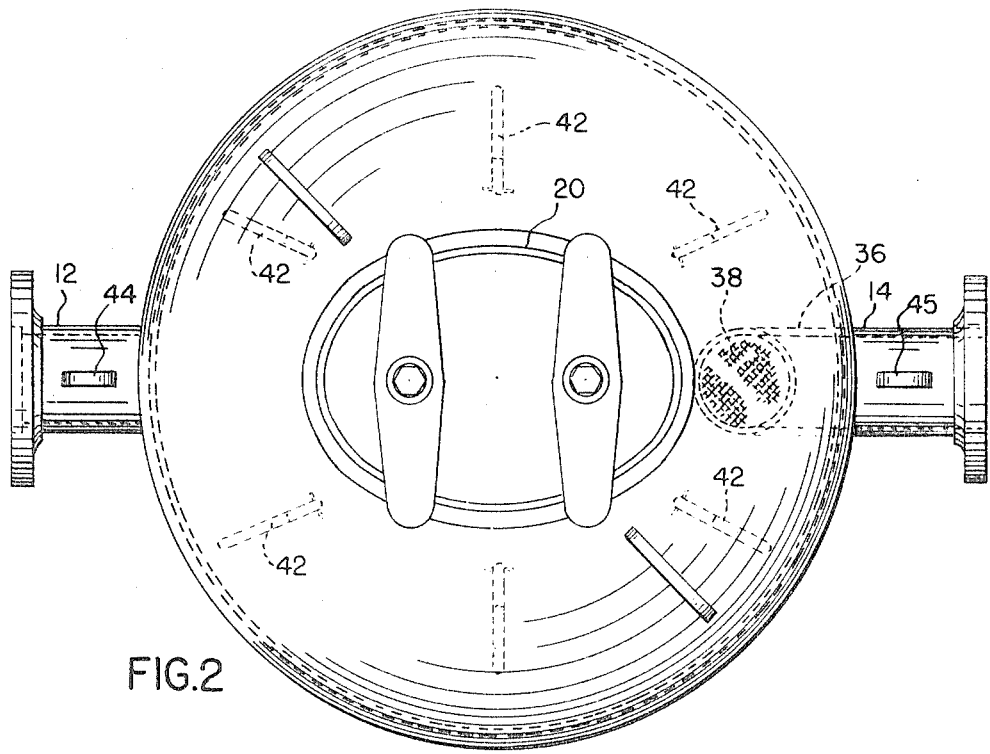
FIG. 2 is a top plan view of the FIG. 1 mechanism.

Referring now again to the drawings, the filter mechanism may comprise an enclosure 10 which in the embodiment illustrated comprises a generally upstanding or vertically elongated, cylindricallike metallic tank having an inlet 12 for receiving pressurized gas and an outlet 14 for removal of the gas from the filter or scrubber tank. In the embodiment illustrated, the enclosure comprises a generally cylindrical central sleeve section 16 and upper and lower dome-shaped, end sections 18 and 18a which are suitably connected as by means of welds, to the central sleeve section 16 and in gastight relationship.

The upper end section 18 may be provided with a gastight access opening or hatch 20 which provides for insertion of the fibrous material of the scrubber bed 22, and also provides for accessibility to the bed for cleaning thereof as will be hereinafter described. A drain 24 may be provided in the bottom section 18a of the enclosure for draining away contaminant solution which accumulates in the bottom of the enclosure due to the entrapment of hydrocarbons, condensed moisture and other contaminants by the bed, and which contaminants may drain down into the bottom of the enclosure. The drain may be provided with a valve mechanism 25 of any suitable type for controlling the draining of the contaminant solution from the enclosure. The enclosure 10 may be supported in upright condition on ringlike stand 26 or by any other suitable support means, such as, for instance, laterally spaced legs.

The gas inlet 12 for the filter mechanism may comprise a duct 27 which, in the embodiment illustrated, enters the side of the enclosure and then extends upwardly as at 27a to terminate adjacent or at the vertical axis X-X of the scrubber enclosure. An inverted dish-shaped baffle 28 may be secured to the exit end of the inlet duct 27 for causing the inlet gas as it egresses from the exit end of the inlet duct, to impinge on the underside concave surface of the baffle, and causing the inlet gas to be directed outwardly and downwardly from the baffle plate in a generally uniform pattern into the lower chamber 29 of the scrubber enclosure, below the generally horizontally oriented bed supporting grid 30. The engagement of the inlet gas with the interior surfaces of the enclosure in lower chamber 29 causes cooling of the gas since the latter may be at a temperature of up to approximately 175° F., while the enclosure is at ambient temperature. This cooling aids in separation of moisture from the gas prior to passage of the gas into bed 22.

Figure 3:
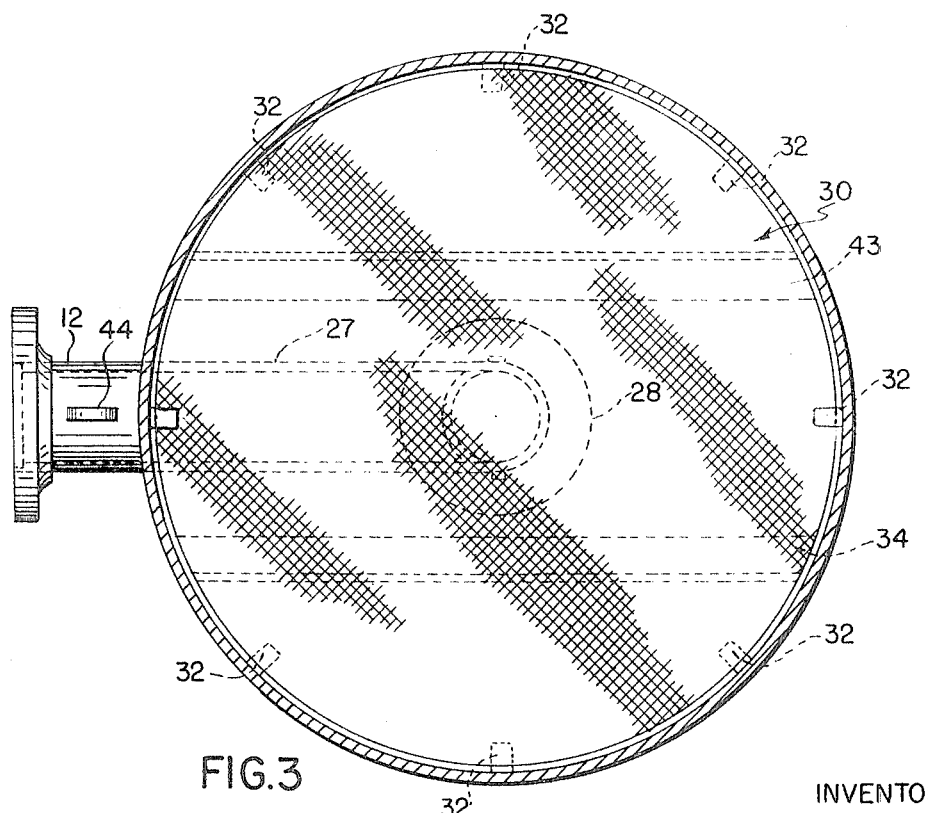
FIG. 3 is a sectional view taken generally along the plane of line 3-3 of FIG. 1 looking in the direction of the arrows.

Grid 30 is preferably of an extremely open construction and may be formed of expanded metal or the like. The grid may be supported on the sides of the enclosure by means of upper and lower brackets 32 which hold the grid 30 in predetermined position in the interior of the enclosure and supports the bed of curled fibrous mesh material 22 thereon. Grid 30 is preferably of such porosity that it provides substantially no resistance to the passage of gas therethrough, thereby aiding in maintaining a minimum pressure drop in the scrubber mechanism. Elongated support members 34 (FIGS. 1 and 3) extending across the scrubber interior may also be provided for aiding in supporting the grid and the weight of the bed 22 on the grid.

The gas outlet 14 from the scrubber enclosure communicates with the upper chamber 35 of the enclosure and may include a generally vertically extending duct 36 which is preferably closed at its upper end by means of a relatively fine mesh screen 38 to prevent any small particles from the fibrous bed 22 from being carried out of the scrubber with the exiting gas stream. Duct 36, in the embodiment illustrated, curves outwardly and extends through the side wall of the enclosure as can be seen in FIG. 1. While the gas inlet and gas outlet are shown as extending through the sides of the enclosure, such inlet and outlet could enter the enclosure at the vertical axis thereof and be generally directly in line with one another.

Bed 22 is comprised of curled, fibrous, ribbonlike material disposed in meshlike form, and which is adapted to retain or trap hydrocarbons and other contaminants disposed in the gas stream, as the latter passes through the bed. Such fibrous material may be formed of fiberglass, plastic, or curled metallic wire or ribbon, and having a predetermined bulk density when forming the bed 22, so as to minimize pressure drop through the mechanism. Suitable metallic materials may be stainless steel wire, nickel-silver wire, bronze wire, and/or carbon steel wire or ribbon. Preferably the wire forming the bed 22 is a substantially continuous wire of elliptical configuration in cross section that measures approximately 0.001 to 0.002 inches by 0.018 to 0.025 inches, and which has been drawn and curled to form a meshlike mass of minute pore openings.

Such meshlike mass of fibrous bed material subjects the gas passing therethrough to infinite numbers of directional changes while exposing it to a vast surface area, to thereby effectively trap contaminants found in the gas. The open pore bed is extremely elastic and permits passage of the gas stream through the bed with substantially no pressure drop, or at least with a maximum pressure drop or less than one percent. It is preferable that the fibrous material of the bed 22 possesses a bulk density of approximately 16 pounds per cubic foot as installed in the scrubber mechanism. However, a bulk density of the bed within a range of approximately 12 to 22 pounds per cubic foot has been found to operate satisfactorily for effectively trapping hydrocarbon contaminants and other contaminants, and without producing undue pressure drop. The upper section 18 of the scrubber mechanism may be provided with spaced generally downwardly extending extensible rods 42 which are adapted to coact at their lower ends with a hold down grating assembly 43 (FIGS. 4 and 6) defining the upper level of the fibrous bed. Assembly 43, in the embodiment illustrated, comprises sections 43a 43b and 43c of open screening or grating to reduce pressure drop, and which sections engage the top of the bed 22 to maintain the latter at the desired density. Rods 42 are adjustable or extensible so as to selectively vary the level of the grating sections. The extensible lower portion 42a of each rod may have an abutment 42b secured thereto adapted for engagement with the top surface of the respective grating section. Removable fastener means 42c extending through the selected opening in the upper portion of each rod and through the associated lower portion, provide for positioning the hold down grid assembly at the desired level to provide for the desired bulk density of the bed. Rods 42 may be marked for rapid identification by a workman of the necessary location of associated fastener 42c to provide for the selected density of the bed, such adjustment being accomplished through hatch 20. Such grid assembly also, of course, restricts upward movement of the bed as a unit during application of pressurized gas to the scrubber mechanism.

The pressurized gas entering inlet 12 is preferably at a pressure of between 80 to 300 p.s.i.g. with the gas possessing a velocity of approximately 50 to 70 lineal feet per minute through the scrubber. As the pressurized gas passes through the scrubber bed, the contaminants in the gas stream, such as hydrocarbons, solid particles, and any condensed moisture, are retained by the bed, with the cleansed gas passing upwardly and then outwardly down through the outlet duct 36 and through outlet 14. Some of the retained dirt, oil and moisture from the bed may drip down to the lower portion of the enclosure where it can be periodically removed via the drain 24 and associated drain control 25.

As the bed becomes contaminated by retained hydrocarbons and dirt, the passage of gas through the bed is of course restricted, and in this connection there is preferably provided gauge means 44, 45 which respectively indicate the pressure of the inlet gas at the inlet 12 and the pressure of the outlet gas at the outlet 14. When the pressure differential as indicated by the gauge means 44, 45 increases to a predetermined amount, as for instance within a range of 1.5 to 2 p.s.i.g., this is an indication that the bed has to be rejuvenated or cleansed of its contaminants in order to maintain minimum pressure drop through the scrubber mechanism. Accordingly, the access hatch 20 may be opened after the pressured gas at the inlet is turned off and the vessel has been depressurized by opening drain valve 25. Valve means of conventional type may be provided immediately ahead of and behind respectively the inlet 12 and outlet 14 for accomplishing this. Some degreasing industrial solvent may then be poured through the top hatch onto the bed. A suitable solvent is degreasing grade trichloroethylene, a standard industrial solvent. With the top hatch still removed, inlet gas may then be reapplied to the mechanism to cause bubbling or movement and retention of the solvent in the bed for a period of time to enable good cleaning of the bed. Afterward the contaminated solvent can be drained from the vessel via drain 24. If necessary the cleaning operation may be repeated a second time by pouring solvent through the bed and then removing it via the drain 24. Repressurizing the scrubber may then be used to dry the bed material and remove all evidence of the solvent from the scrubber. The bed is thus rejuvenated and ready for removal of contaminants and especially hydrocarbons and the like, from pressurized gas for a further period of time. It has been found that the scrubber mechanism of the invention will effectively remove approximately 95 percent of the hydrocarbons formed in the pressurized gas. The scrubber mechanism may be effectively used with all types of compressed gas drying equipment, including the deliquescent desiccant type, the solid or liquid regenerative type, and the refrigeration type.

From the foregoing description and accompanying drawings it will be seen that the invention provides a novel gas filter or scrubber mechanism for effective removal of contaminants, such as hydrocarbon contaminants and especially hydrocarbon aerosols and mists, from a stream of pressurized gas, and which does not create any material pressure drop across the mechanism. The scrubber mechanism operates without moving parts and includes a bed of curled fibrous meshlike material of predetermined bulk density, for effecting the removal of the contaminants from the pressurized gas stream. The invention also provides a novel method of removing contaminants, such as hydrocarbon aerosols and mists from a pressurized gas stream and utilizes a filter mechanism which includes a bed of fibrous curled filter material which is adapted to be regenerated after it becomes dirty or clogged with contaminants, for reuse of the bed.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the terms and expressions utilized to define the invention.

What we claim is:

1. A scrubber mechanism for removing oil and other contaminants from gas under pressure comprising an upright enclosure, a gas inlet into the enclosure, a gas outlet from the enclosure, substantially horizontal gas pervious means dividing said enclosure into an upper chamber and a lower chamber, said means being of open construction for the ready passage of gas therethrough and being disposed intermediate said inlet and said outlet, and a gas pervious bed of fibrous material supported on said means and adapted to trap oil and other contaminants contained in the gas when the latter passes through said bed, said bed comprising fibrous material having an elastic and compressible mass of curled strand material having a bulk density of between approximately 12 to 22 pounds per cubic foot, drain means connected with said enclosure communicating with said lower chamber for removing solution from said enclosure draining down from said bed, gas duct means coupled to said inlet and extending into said enclosure to approximately the vertical axis of said enclosure, baffle means spaced from and aligned adjacent the outlet end of said duct means for diffusing the inlet gas outwardly in said lower chamber laterally of said vertical axis and into engagement with the interior of said lower chamber of said enclosure prior to the gas passing through said bed, said duct means opening into said lower chamber closely adjacent the underside of said bed, and hold down means coacting with said bed for maintaining the density thereof at a predetermined level, said holddown means comprising an open grating extending across the bed and in engagement with said bed, and means for selectively adjusting the vertical position of said grating in said enclosure relative to said bed.

2. A mechanism in accordance with claim 1 wherein said enclosure comprises a generally upright cylindrical tank.

3. A mechanism in accordance with claim 1 wherein said baffle means comprises an inverted dish-shaped member spaced from the upwardly facing exit end of said gas duct means for directing the inlet gas outwardly and downwardly in said lower chamber prior to passage thereof upwardly and through said gas pervious means.

4. A mechanism in accordance with claim 3 wherein said bed comprises curled metallic strand material.

5. A mechanism in accordance with claim 4 wherein the metallic strand material is selected from the group consisting of bronze, stainless steel, nickel-silver, and carbon steel.

6. A mechanism in accordance with claim 4 wherein said strand material has strand diameter of approximately 0.018 to 0.025 inch.

7. A mechanism in accordance with claim 3 wherein said outlet includes a curved duct extending downwardly from a location adjacent the upper end of said enclosure and then extending laterally outwardly through the side of said enclosure.

8. A mechanism in accordance with claim 7 wherein said grating is of sectional construction, said enclosure having an access opening therein for communicating said upper chamber with the exterior of said enclosure, openable means closing said opening in gastight relation, said grating sections being receivable through said opening for coaction with said bed, one of said sections having means therein coacting with said outlet duct in at least partially encompassing relation, said one section being positionable vertically with the other sections and without interference with said outlet duct due to the last mentioned means, and wherein said means for selectively adjusting the position of said grating comprises extensible rod means coacting between said grating and the upper end portion of said enclosure.